United States Patent [19]
Jones, Jr. et al.

[11] 3,926,834
[45] Dec. 16, 1975

[54] LOW MELTING POINT DISUBSTITUTED-P,P'-PHENYL CINNAMATE LIQUID CRYSTALS

[75] Inventors: Freeman B. Jones, Jr., Westlake Village; Joseph J. Ratto, Thousand Oaks, both of Calif.

[73] Assignee: Rockwell International Corporation, El Segundo, Calif.

[22] Filed: Oct. 1, 1973

[21] Appl. No.: 402,531

[52] U.S. Cl............. 252/299; 252/408; 260/473 R; 260/476 R; 350/160 LC; 428/1
[51] Int. Cl.²...................... C09K 3/34; C07C 69/76
[58] Field of Search...... 252/299, 408; 350/160 LC; 260/473 R, 476 R; 428/1

[56] References Cited
UNITED STATES PATENTS

| | | | |
|---|---|---|---|
| 3,322,485 | 5/1967 | Williams | 252/299 |
| 3,773,747 | 11/1973 | Steinstrasser | 252/408 |

FOREIGN PATENTS OR APPLICATIONS

| | | | |
|---|---|---|---|
| 2,024,269 | 12/1971 | Germany | 252/299 |

OTHER PUBLICATIONS

Landolt–Bornstein, Vol. 2, Part 2a, Springer–Berlin 6th Ed. (1960), pp. 266–267, 295; "Umwandlungstemperaturen Kristalliner Flussigkeitien", Kast.
"Nematic p,p'–disubstituted phenylbenzoates & low melting eutectic mixtures", Steinstrasser, Z. Naturforsch. Vol. 27b, pp. 774–779 (1972).
"Chemical Characteristics, Structure, and Properties of Liquid Crystal", V. A. Usol'Tseva et al., Russ. Chem. Rev., Vol. 32, No. 9, pp. 495–507 (1963).

*Primary Examiner*—Leland A. Sebastian
*Assistant Examiner*—T. S. Gron
*Attorney, Agent, or Firm*—H. Fredrick Hamann; G. Donald Weber, Jr.; Robert Ochis

[57] ABSTRACT

A new nematic liquid crystal system is disclosed. The system utilizes disubstituted-p, p'-phenyl cinnamates as liquid crystals and combines various of these liquid crystals to expand the nematic temperature range of the composite over that of the individual components, thus providing a family of low melting point nematic liquid crystals. These crystals have the general formula

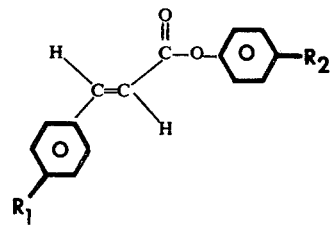

where $R_1$ and $R_2$ can be n-alkyl $[CH_3(CH_2)_n]$; n-alkoxy $[CH_3(CH_2)_nO]$ and acyloxy $[CH_3(CH_2)_nCO_2]$ groups.

10 Claims, No Drawings

LOW MELTING POINT DISUBSTITUTED-P,P'-PHENYL CINNAMATE LIQUID CRYSTALS

BACKGROUND OF THE INVENTION

1. Field of the Invention

This invention relates to the field of liquid crystals and more particularly to the field of nematic liquid crystals.

2. Prior Art

Many nematic liquid crystals are known and are used in display applications for electronic readouts. Most of the liquid crystals used in these systems are Schiff-base materials and are liquid crystals at room temperature. The Schiff-base materials unfortunately are highly unstable in the presence of water and ultraviolet light. This requires extreme care in the handling of these materials to prevent contamination and degradation. An example of such prior art liquid crystals is given in U.S. patent application Ser. No. 297,172, filed Oct. 12, 1972 as a continuation of Ser. No. 86,515, filed Nov. 6, 1970 (now abandoned) by Chang et al, for "Nematic Liquid Crystal Compositions" which discusses the use of a eutectic mixture of interalia methoxy-benzylidene-butylaniline and ethoxy-benzylidene-butylaniline. Some ways of improving the characteristics of such liquid crystals are disclosed in U.S. patent applications Ser. Nos. 357,565; 357,566 and 357,567 for "Nematic Liquid Crystals Doped to Raise Their Dynamic Scattering Cutoff Frequency"; "Doping of Nematic Liquid Crystals" and "Homotropic Alignment of Liquid Crystals in a Display Cell by Baked on Ionic Surfactants", respectively, assigned to the common assignee.

SUMMARY OF THE INVENTION

The invention relates to liquid crystal materials and systems. In particular, there is disclosed a disubstituted-p, p'-phenyl cinnamate liquid crystal system. Liquid crystal materials of this class are more stable in the presence of atmospheric contaminants than the prior art Schiff-base materials are. Although individual members of the system have a relatively narrow nematic temperature range, binary and ternary mixtures of properly selected and proportioned members of this liquid crystal system yield liquid crystals having wide nematic temperature ranges.

Liquid crystals in this system have the following general formula

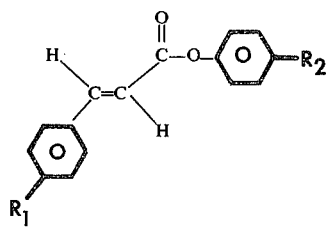

as where $R_1$ and $R_2$ can be n-alkyl $[CH_3(CH_2)_n]$; n-alkoxy $[CH_3(CH_2)_nO]$ and acyloxy $[CH_3(CH_2)_nCO_2]$ groups.

Mixtures of the various liquid crystals within the system are formed by heating the desired proportions of the various components to above their nematic-isotropic transition temperatures to form a solution. The solution then displays nematic characteristics over a wider temperature range than the individual components and exhibits a lower minimum temperature for nematic behavior than the individual components.

DESCRIPTION OF THE PREFERRED EMBODIMENT

The inventive liquid crystal system comprises cinnamic acid esters having the general formula

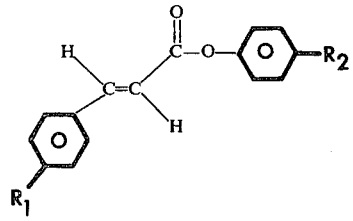

where $R_1$ and $R_2$ can be n-alkyl $[CH_3(CH_2)_n]$; n-alkoxy $[CH_3(CH_2)_nO]$ and acyloxy $[CH_3(CH_2)_nCO_2]$ groups.

The cinnamic acid esters (cinnamates) which constitute the liquid crystals within the system may be prepared by the following method. First, an appropriate p-substituted benzaldehyde is condensed with malonic acid in a pyridine/piperidine medium at 100°C. The resulting cinnamic acid is isolated and purified by recrystallization from either an acetic acid solution or an ethanol/water solution. The resulting purified acid is treated with thionyl chloride in order to form the appropriate acid chloride. The resulting acid chloride is reacted with an appropriate p-substituted phenol at a reaction temperature of 100°C to yield the desired disubstituted-p,p'-phenyl cinnamate which is a liquid crystal within the system.

EXAMPLE 1

Preparation of a cinnamic acid ester of the formula

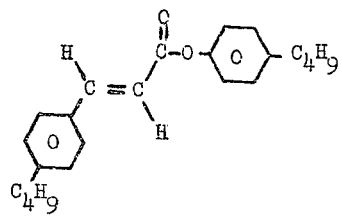

First, the p-substituted cinnamic acid is produced as follows. A solution of 23 grams of p-n-butylbenzaldehyde, 22 grams of malonic acid, 40 milliliters of pyridine and 10 drops of piperidine is heated at 100°C for 3 hours. After this time, the mixture is passed over 125 grams of ice and 125 milliliters of concentrated hydrochloric acid. The precipitate that forms is filtered and washed with dilute hydrochloric acid and water and recrystallized either from acetic acid or ethanol/water mixtures. The recrystallized precipitate constitutes the desired p-substituted cinnamic acid. The preparation of the liquid crystal continues as follows. A solution containing 4.3 grams of the above purified acid and 3 grams of thionyl chloride is heated over a steam bath until hydrogen chloride ceases to be evolved (about 2 hours), and is then allowed to cool. To the resulting mixture is added 3.7 grams of redistilled p-n-butylphenol and heating is continued until the evolution of hydrogen chloride ceases. n-Hexane is then cautiously added and the resultant mixture cooled until crystals precipitate. The crystals are collected and recrystallized several times from n-hexane. The final recrystallized precipitate is the desired cinnamic acid ester.

EXAMPLE 2

Preparation of p-n-pentanoyloxycinnamic acid. 40.4g (0.3 mole) of pentanoyl chloride was slowly added to a cooled solution (about 5°C) of p-hydroxycinnamic acid in 175 g of dry pyridine over a period of 30 minutes. The mixture was stirred for four hours while the temperature slowly increased to room temperature. The resulting solution was poured over ice and slowly acidified with dilute $H_2SO_4$. The resulting material was allowed to solidify and then filtered. This solid product was purified by Norite treatment of the first of several recrystallizations from ethanol/water. This procedure afforded 20 g (40%) of the desired temperatures for the transitions between crystal and smectic states; between smectic and nematic or crystal and nematic states as the case may be; and between nematic and isotropic states are given. A monotropic transition is one which occurs only while cooling the liquid crystal from its nematic state. The monotropic state occurs prior to crystallization as a solid.

Mixtures of properly selected cinnamates within this invention exhibit much greater nematic temperature ranges than the individual components. The nematic temperature ranges of these mixtures normally extend to below the melting point of any individual component. This is illustrated by the examples 3–6 below and Table II. To form such a mixture, the desired proportions of individual compounds are heated together to above the nematic-isotropic transition temperature of each component compound to form a solution which then displays a widened temperature range. The compound numbers in the following examples refer to the compounds as identified in Table I.

Table I

| Transition Temperatures for p,p'-trans-Cinnamates | | | | | |
|---|---|---|---|---|---|
| No. | $R_1$ | $R_2$ | Crystal-Smectic (°C) | Smectic-Nematic or Crystal-Nematic if no Smectic (°C) | Nematic-Isotropic (°C) |
| 1 | $C_3H_7$ | $C_5H_{11}$ | | 59.7 | 69.6 |
| 2 | $C_4H_9$ | $C_4H_9$ | | 52.5 | 61.3 |
| 3 | $C_4H_9$ | $C_5H_{11}$ | | 81.1 | 104.9 |
| 4 | $C_4H_9$ | $CH_3O$ | | 81.3 | 88.8 |
| 5 | $CH_3O$ | $C_3H_7$ | | 100.5 | 103.9 |
| 6 | $CH_3O$ | $C_4H_9$ | | 81.8 | 93.0 |
| 7 | $C_5H_{11}O$ | $C_4H_9$ | | 96.2 | 102.0 |
| 8 | $C_5H_{11}O$ | $C_5H_{11}$ | | 99.1 | 138.8 |
| 9 | $C_7H_{15}O$ | $C_4H_9$ | 72.9 | 86.1 | 110.7 |
| 10 | $C_4H_9CO_2$ | $C_2H_5O$ | | 108.9(88.9)* | 139.3 |
| 11 | $C_4H_9CO_2$ | $C_4H_9O$ | | 94.6 | 140.1 |
| 12 | $C_5H_{11}CO_2$ | $CH_3$ | | 87.6 | 120.7 |
| 13 | $C_5H_{11}CO_2$ | $C_4H_9$ | | 73.2 | 119.3 |
| 14 | $C_5H_{11}CO_2$ | $C_5H_{11}$ | | 99.1 | 106.6 |
| 15 | $C_5H_{11}CO_2$ | $CH_3O$ | | 69.3 | 136.6 |
| 16 | $C_5H_{11}CO_2$ | $C_2H_5O$ | | 95.9 | 147.3 |
| 17 | $C_5H_{11}CO_2$ | $C_4H_9O$ | | 101.0 | 150.5 |
| 18 | $C_7H_{15}CO_2$ | $CH_3$ | | 94.8 | 112.1 |
| 19 | $C_7H_{15}CO_2$ | $C_2H_5$ | | 74.6 | 108.4 |
| 20 | $C_7H_{15}CO_2$ | $C_3H_7$ | | 100.2 | 117.0 |
| 21 | $C_7H_{15}CO_2$ | $C_4H_9$ | 70.0(43.0)* | 96.2 | 114.0 |
| 22 | $C_7H_{15}CO_2$ | $C_5H_{11}$ | 88.7(63.7)* | 103.0 | 117.6 |
| 23 | $C_7H_{15}CO_2$ | $CH_3O$ | 68.5 | 75.4 | 138.8 |
| 24 | $C_7H_{15}CO_2$ | $C_2H_5O$ | | 94.6 | 147.0 |
| 25 | $C_7H_{15}CO_2$ | $C_4H_9O$ | 83.1 | 95.1 | 138.8 |

*Monotropic transition p-n-pentanoyloxycinnamic acid in crystalline form which has a melting point of 149.5°C.

p-Tolyl-p'-n-pentanoyloxycinnamate was produced from the above p-n-pentanoyloxycinnamic acid as follows. 1.3g (0.01 moles) of thionyl chloride was slowly added to a well stirred mixture of p-n-pentanoyloxycinnamic acid (2.6g, 0.01 mole) and 75 ml of benzene, while maintaining the reaction mixture of 50°C. The temperature was slowly raised to reflux (about 80°C) and held there until no further evolution of gases occurred and then cooled to 25°C. About 1.1g (0.01 moles) pre-cresol was added to the reaction mixture which was then refluxed for two hours. The solution was cooled and the precipitate which formed was collected. Several recrystallizations from isopropyl alcohol gave 2.5g (74%) of the desired product (p-tolyl-p'-n-pentanoyloxycinnamate) which had a melting point of 94.8°C.

The transition temperatures of some cinnamates in accordance with this invention are given in Table I. The

EXAMPLE 3

A mixture composed of 43.3 mole % of compound number 6 (having a nematic temperature range of 11.2°C-from 81.8°C to 93°C); 37 mole % of compound number 4 (having a nematic temperature range of 7.5°C-from 81.3°C to 88.8°C) and 19.7 mole % of compound number 3 (having a nematic temperature range of 23.8°C from-81.1°C to 104.9°C) has a nematic temperature range of 52.5°C-from 40°C to 92.5°C. The mixture's nematic temperature range begins 41.1°C below the melting point of the lowest melting point of any individual compound included in the mixture and is more than twice as wide as the widest nematic temperature range of an individual compound in this mixture.

EXAMPLE 4

A mixture of 30 weight % of compound number 6 (having a nematic temperature range of 11.2°C-from 81.8°C to 93°C); 26 weight % of compound number 4

(having a nematic temperature range of 7.5°C-from 81.3°C to 88.8°C); 28 weight % of compound number 2 (having a nematic temperature range of 8.8°C-from 52.5°C to 61.3°C); and 16 weight % of compound 3 (having a nematic temperature range of 23.8°C-from 81.1°C to 104.9°C) has a nematic temperature range of 50°C from 33.5°C to 83.5°C which extends 19°C below the melting point of the lowest melting point compound included in the mixture. The nematic temperature range is more than twice that of the widest nematic temperature range compound in this mixture.

EXAMPLE 5

A eutectic mixture (that which has the widest nematic temperature range for that set of compounds) of 57 mole % of compound 6 and 43 mole % of compound 15 has a nematic temperature range of 60.9°C from 50.1°C to 111°C.

EXAMPLE 6

A eutectic mixture of 75 mole % of compound 2 and 25 mole % of compound 18 has a nematic temperature range of 26°C from 42°C to 68°C.

Transition temperatures for various mixtures of cinnamic acid esters within the liquid crystal system are shown in Table II.

Table II.

Nematic Temperature Ranges for Several Cinnamic Acid Esters Multicomponent Mixtures $$\beta - \bigcirc - CH=CH-CO_2 - \bigcirc -$$

| Compound No. | Components | mole % | Nematic Temperature Range (NTR) °C |
|---|---|---|---|
| A | $C_4H_9-\beta-OCH_3/C_4H_9-\beta-C_4H_9$ | 47.0/53.0 | 45 – 70.5 |
| B | $C_4H_9-\beta-OCH_3/C_5H_{11}O-\beta-C_4H_9$ | 69/31 | 41 – 71.0 |
| C | $C_4H_9-\beta-OCH_3/CH_3O-\beta-C_4H_9$ | 44.7/55.3 | 51 – 89.3 |
| D | $CH_3O-\beta-C_4H_9/C_4H_9-\beta-OCH_3/C_4H_9-\beta-C_5H_{11}$ | 43.3/37/19.7 | 40 – 92 |
| E | $C_5H_{11}CO_2-\beta-OCH_3/C_7H_{15}CO_2-\beta-OCH_3$ | 50/50 | 62.2 – 138.2 |
| F | $CH_3O-\beta-C_4H_9/C_5H_{11}CO_2-\beta-OCH_3$ | 57/43 | 50.1 – 111 |
| G | $C_4H_9-\beta-C_4H_9/C_7H_{15}CO_2-\beta-CH_3$ | 75/25 | 42 – 68 |
| H | $CH_3O-\beta-C_4H_9/C_4H_9-\beta-OCH_3/C_4H_9-\beta-C_4H_9/C_4H_9-\beta-C_5H_{11}$ | 30/26/28/16 (weight %) | 33.5 – 83.5 |

The above results are typical of beneficial results of mixing liquid crystals from the system. Other mixtures have other nematic temperature ranges and are also of interest.

The favorable environmental effects achieved by the use of liquid crystals within the system is demonstrated by Example 7.

EXAMPLE 7

The mixture of Example 3 was exposed to sunlight and outdoor environmental contaminants for 1 hour. As a result of this exposure the mixture displayed no visible color change or drop in transition temperatures. A second sample also in accordance with Example 3 was exposed to laboratory environmental conditions at a temperature of 100°C for 25 hours. The color of the sample was unchanged and the nematic-isotropic transition temperature had dropped only 1°C.

EXAMPLE 8

A sample composed of 67 mole % of number 2 and 33 mole % of number 13 was exposed to laboratory contaminants at a temperature of 80°C for 72 hours. This exposure produced no change in the color and the nematic-isotropic transition temperature of 73.6°C was unchanged.

The above results contrast markedly with the results obtained from a Schiff-base material such as a eutectic mixture of p-methoxybenzylidene-p'-n-butylaniline (MBBA) and p-ethoxybenzylidene-p'-n-butylaniline (EBBA) whose nematic-isotropic transition temperature drops from 61°C to 57°C after being exposed to atmospheric contaminants at room temperature for a few minutes.

Although no change occurred in the above examples, it may be possible that longer exposures can result in some degradation of the sample.

The liquid crystals of this invention are useful in electro-optic display cells of the type used in optical readout calculators, watches and other display devices. Their usefulness is enhanced by their stability with respect to contaminants, although the display cells must be heated when crystals with melting points above ambient temperature are used.

What is claimed is:
1. A nematic liquid crystal, selected from the group consisting of cinnamic acid esters of the formula

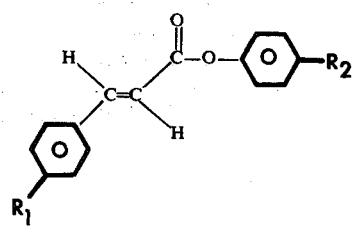

wherein $R_1$ can be $C_xH_{2x+1}$, $C_xH_{2x+1}O$, $C_xH_{2x+1}CO_2$; and $R_2$ can be $C_yH_{2y+1}$, $C_yH_{2y+1}O$ and $C_yH_{2y+1}CO_2$ and where $x$ and $y$ are integers with $1 \leq x \leq 10$ and $1 \leq y \leq 10$, and said nematic liquid crystal having a melting point of less than 95°C.

2. A nematic liquid crystal composition comprising a mixture of two nematic liquid crystals each selected from the group consisting of cinnamic acid esters of the formula

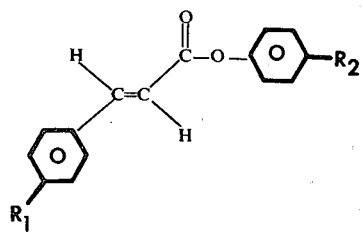

wherein $R_1$ can be $C_xH_{2x+1}$, $C_xH_{2x+1}O$, and $C_xH_{2x+1}CO_2$; and $R_2$ can be $C_yH_{2y+1}$, $C_yH_{2y+1}O$ and $C_yH_{2y+1}CO_2$, where $x$ and $y$ are integers with $1 \leq x \leq 11$ and $1 \leq x \leq 11$.

3. A nematic liquid crystal composition comprising a mixture of a plurality of nematic liquid crystal selected from the group consisting of cinnamic acid esters of the formula

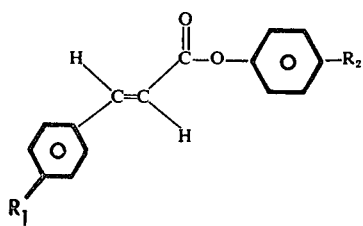

wherein $R_1$ can be $C_xH_{2x+1}$, $C_xH_{2x+1}O$, and $C_xH_{2x+1}CO_2$; and $R_2$ can be $C_yH_{2y+1}$, $C_yH_{2y+1}O$, and $C_yH_{2y+1}CO_2$, where $x$ and $y$ are integers with $1 \leq x \leq x \leq 11$ and $1 \leq y \leq 11$.

4. The nematic liquid crystal composition recited in claim 3 wherein:
in a first liquid crystal component of said mixture $R_1 = CH_3O$ and $R_2 = C_4H_9$;
in a second liquid crystal component of said mixture $R_1 = C_4H_9$ and $R_2 = OCH_3$;
in a third liquid crystal component of said mixture $R_1 = C_4H_9$ and $R_2 = C_4H_9$;
in a fourth liquid crystal component of said mixture $R_1 = C_4H_9$ and $R_2 = C_5H_{11}$; and
said first, second, third and fourth components of said mixture comprise about 30 weight percent, about 26 weight percent, about 28 weight percent and about 16 weight percent of said mixture, respectively.

5. The nematic liquid crystal composition recited in claim 3 wherein:
in a first liquid crystal component of said mixture $R_1 = CH_3O$ and $R_2 = C_4H_9$;
in a second liquid crystal component of said mixture $R_1 = C_4H_9$ and $R_2 = OCH_3$;
in a third liquid crystal component of said mixture $R_1 = C_4H_9$ and $R_1 = C_5H_{11}$; and
said first, second and third components of said mixture comprise about 43.3 weight percent, about 37 weight percent and about 19.7 weight percent of said composition, respectively.

6. The nematic liquid crystal composition recited in claim 2 wherein:
in a first liquid crystal component of said mixture $R_1 = C_4H_9$ and $R_2 = OCH_3$;
in a second liquid crystal component of said mixture $R_1 = C_5H_{11}O$ and $R_2 = C_4H_{11}$; and
said first and second components of said mixture comprise about 69 weight percent and about 31 weight percent of said mixture, respectively.

7. The nematic liquid crystal composition recited in claim 2 wherein:
in a first liquid crystal component of said mixture $R_1 = C_4H_9$ and $R_2 = C_4H_9$;
in a second liquid crystal component of said mixture $R_1 = C_7H_{15}CO_2$ and $R_2 = CH_3$; and
said first and second components of said mixture comprise about 75 weight percent and about 25 weight percent of said mixture, respectively.

8. The nematic liquid crystal composition recited in claim 2 wherein:
in a first liquid crystal component of said mixture $R_1 = C_4H_9$ and $R_2 = OCH_2$;
in a second liquid crystal component of said mixture $R_1 = C_4H_9$ and $R_2 = C_4H_9$; and
said first and second components of said mixture comprise about 47 weight percent and 53 weight percent of said mixture, respectively.

9. The nematic liquid crystal composition recited in claim 2 wherein:
in a first liquid crystal component of said mixture $R_1 = CH_3O$ and $R_2 = C_4H_9$;
in a second liquid crystal component of said mixture $R_1 = C_5H_{11}CO_2$ and $R_2 = OCH_3$; and
said first and second components of said mixture comprise about 57 weight percent and about 43 weight percent of said mixture, respectively.

10. The nematic liquid crystal composition recited in claim 1 wherein:
$R_1 = C_4H_9$;
$R_2 = C_4H_9$; and
said liquid crystal melts at about 52.1°C and has a nematic temperature range of from about 52.1°C to about 61.3°C.

* * * * *